(12) United States Patent
Nurmi

(10) Patent No.: US 7,747,955 B2
(45) Date of Patent: Jun. 29, 2010

(54) CONTROLLING OF LOADING OF INFORMATION

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 774 days.

(21) Appl. No.: 11/095,937

(22) Filed: Mar. 30, 2005

(65) Prior Publication Data

US 2006/0230355 A1   Oct. 12, 2006

(51) Int. Cl.
*G06F 3/00* (2006.01)
*G06F 15/16* (2006.01)
(52) U.S. Cl. .................................. 715/745; 709/218
(58) Field of Classification Search ............... 715/745, 715/513; 709/218
See application file for complete search history.

(56) References Cited

U.S. PATENT DOCUMENTS

| | | | |
|---|---|---|---|
| 6,035,330 A | 3/2000 | Astiz et al. | |
| 6,098,102 A * | 8/2000 | Nielsen et al. | 709/229 |
| 6,324,553 B1 * | 11/2001 | Cragun et al. | 715/236 |
| 6,356,924 B2 * | 3/2002 | Mullen-Schultz | 715/236 |
| 6,487,588 B1 * | 11/2002 | Phillips et al. | 709/218 |
| 6,917,960 B1 * | 7/2005 | Decasper et al. | 709/203 |
| 7,085,816 B1 * | 8/2006 | McBrearty et al. | 709/217 |
| 2001/0011261 A1 | 8/2001 | Mullen-Schultz | |
| 2003/0093520 A1 * | 5/2003 | Beesley | 709/224 |
| 2003/0119537 A1 * | 6/2003 | Haddad | 455/517 |
| 2004/0205502 A1 | 10/2004 | Baird | |
| 2005/0007337 A1 | 1/2005 | Sellen et al. | |

* cited by examiner

*Primary Examiner*—Joshua D Campbell
*Assistant Examiner*—Stephen Alvesteffer
(74) *Attorney, Agent, or Firm*—Alston & Bird LLP

(57) ABSTRACT

A method for browsing a document comprising analyzing at least a part of a structure of the document; providing an icon for an element in the structure; and accessing at least part of the document corresponding to the icon. Also disclosed is a device, a document browser, and a storage media carrying a software program for browsing a document.

13 Claims, 4 Drawing Sheets

CONTROLLING OF LOADING OF INFORMATION

FIELD OF THE INVENTION

The present invention relates to a method for browsing a document. The invention further relates to a device, a document browser, and a storage media carrying a software program comprising machine executable code for browsing a document.

BACKGROUND OF THE INVENTION

In data communication systems information is often transferred (downloaded) from one device to another device. For example, the user of the receiving device is browsing the internet wherein information relating to browsed web pages need to be transferred to the receiving device. Due to the limited data transfer rate the download takes some time. Therefore, the user of the receiving device may need to wait before the information is in use. There are systems in which the progress of the download (i.e. the amount of the downloaded information) is shown e.g. in percent wherein the user can evaluate the time needed to complete the download. There are also systems in which the information is downloaded in a stepwise manner so that in the first step only a rough indication of the fact that data is transferred wherein the receiving device can show a rough image indicator on the display of the receiving device. At later steps more accurate information is transferred and the display is updated during the transferring process. This kind of arrangement enables the user to see a coarse image without the need to wait for the completion of the data transfer process.

The above described methods have the drawback that the receiving device may not be able to properly show the progress of the download especially when the receiving device is a mobile device. It may also take more time to download information to a mobile device compared with a situation in which the receiving device is fixedly connected to a high speed (wired line) data transfer network. Further, if the user has selected more than one page of data to be downloaded at the same time it may not be easy to see the progress of the download of each separate page. The user needs to separately check the status of each different download process.

There are some web browser applications in which the user can select whether to allow/prevent the loading of pictures of web pages. However, this selection affects every page the user selects for loading and every picture on a page.

In prior art systems the user has no other possibility than the above mentioned picture loading selection to define which parts of the pages should be downloaded. Moreover, the user has no control on the priority between the pages to be downloaded.

SUMMARY OF THE INVENTION

The present invention discloses a method, a device, a document browser and a software for controlling browsing of a document. The invention provides means for the user to define which parts of the document will be downloaded and also means to define, when necessary, a priority between different parts of information to be downloaded.

According to one aspect of the present invention there is provided a method for browsing a document comprising:
analyzing at least a part of a structure of said document;
providing an icon for an element in said structure; and
accessing at least part of said document corresponding to said icon.

According to another aspect of the present invention there is provided a device comprising
a browser for browsing a document;
an analyzer for analyzing at least a part of a structure of said document;
an indicating element for providing an icon for an element in said structure; and
a downloader for accessing at least part of said document corresponding to said icon.

According to a third aspect of the present invention there is provided a document browser comprising
an analyzer for analyzing at least a part of a structure of a document;
an indicating element for providing an icon for an element in said structure; and
a downloader for accessing at least part of said document corresponding to said icon.

According to a fourth aspect of the present invention there is provided a storage medium carrying a software program comprising machine executable code for browsing of a document;
analyzing at least a part of a structure of said document;
providing an icon for an element in said structure; and
accessing at least part of said document corresponding to said icon.

The present invention enables the user of the receiving device to specify a priority in which different pages or other information packets are downloaded to the receiving device. Further, the invention enables the user to select only certain parts of the pages to be downloaded first wherein the user may decide on the basis of the selected part whether other part(s) of the page(s) should be downloaded or not. For example, the user can define a limit which is used to decide whether e.g. a picture is downloaded or not. The limit can define an upper limit, wherein pictures bigger than the limit will not be downloaded, or the limit can define a lower limit, wherein pictures smaller than the limit will not be downloaded, or the limit can also define that pictures the size of which is near the limit will be downloaded. It is also possible to define the limit depending on a certain hierarchy level. For example, pictures of headers above, below or on a certain level will be downloaded, pictures in tables will be/will not be downloaded, etc.

DESCRIPTION OF THE DRAWINGS

In the following the invention will be described in more detail with reference to the appended figures in which.

DETAILED DESCRIPTION OF THE INVENTION

Figure 4:
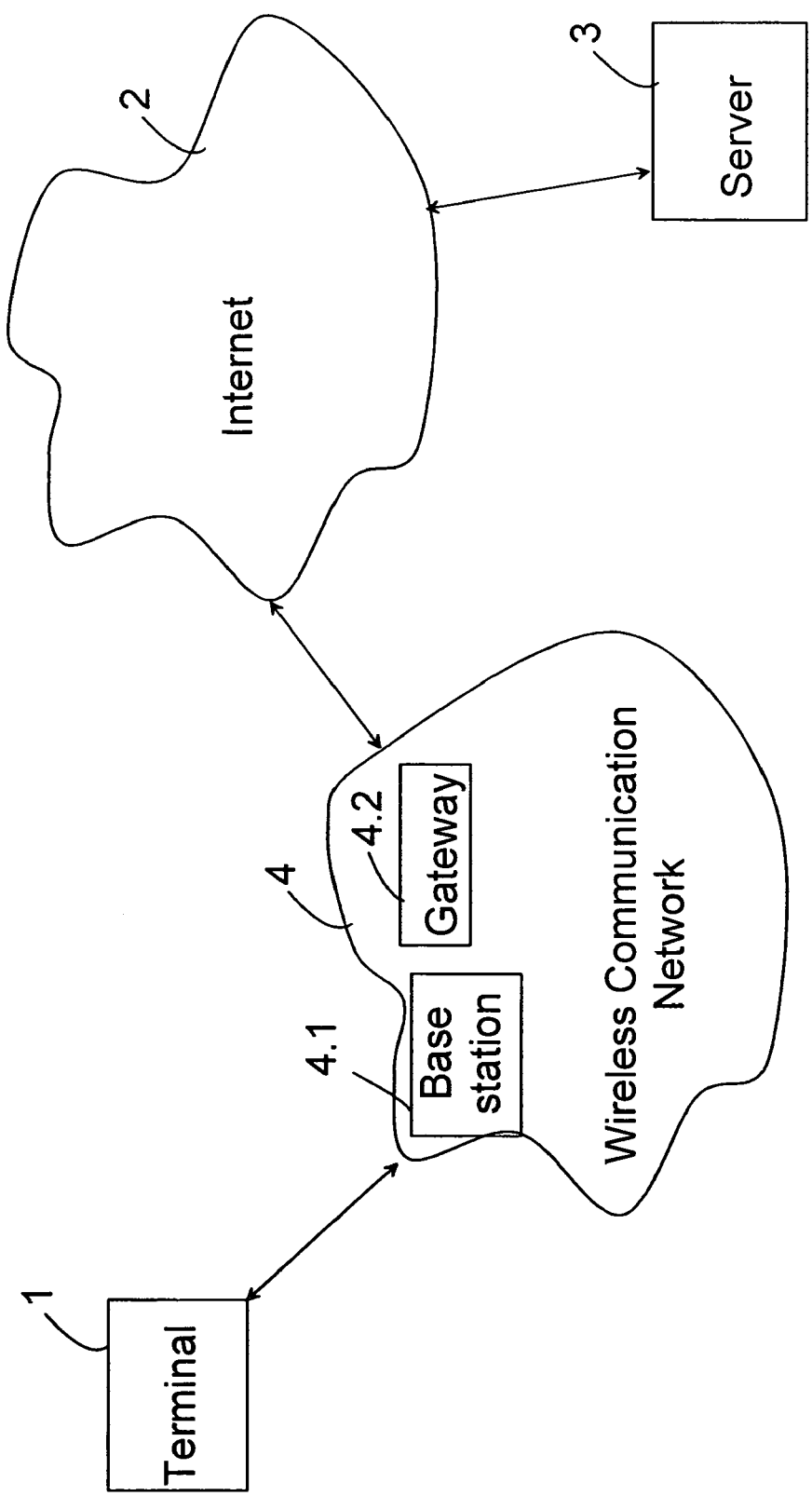
FIG. 4 depicts an example of a system according to the present invention.

In the following an example embodiment of the present invention will be described using web pages as downloadable information sources and internet and mobile communication networks as examples of communication networks through which the data transfer can be applied. Further, the device 1 which is used as the receiving device is a wireless communication device. However, the invention is not limited to those examples only. In FIG. 4 an example embodiment of a system according to the present invention is depicted as a simplified block diagram.

In the internet 2 there are numerous places where information is stored. The storage places are e.g. servers 3 which are in a communication connection with the internet 2 either directly or via another network 4. The devices 1, 3 which are connected to the internet are provided with a unique address. The address can either be a fixed address or a dynamic address. The address can be used to identify the source of the information to be downloaded and also the destination of the information.

Figure 1:
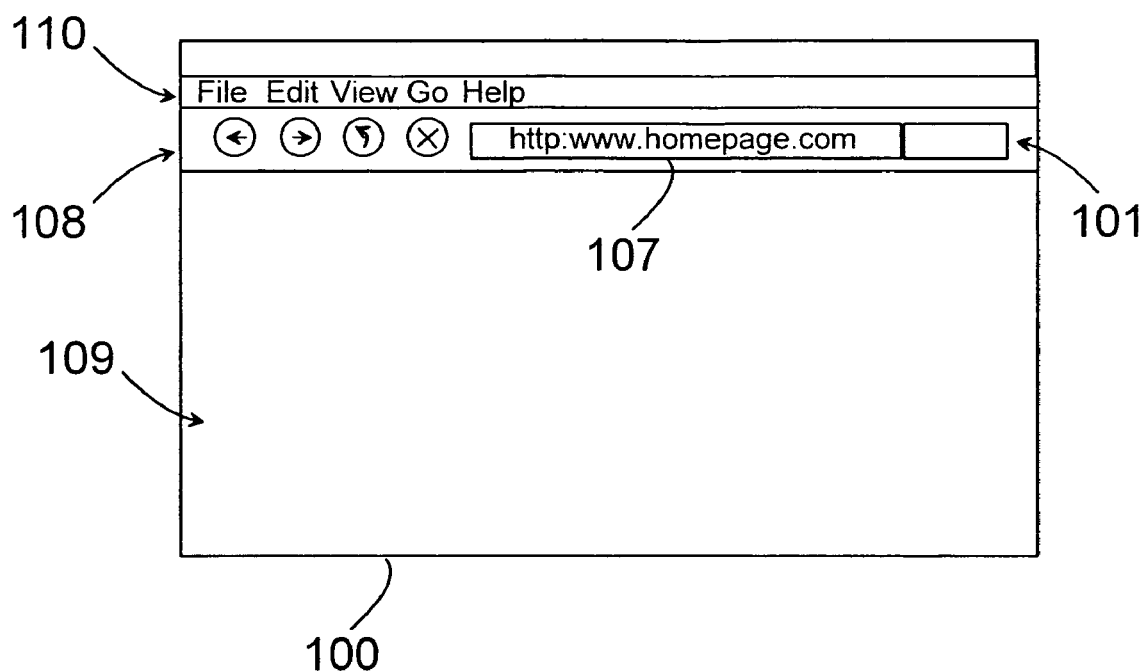
FIG. 1 depicts an example of a downloaded page displayed on a display of a receiving device.

When the user of the device 1 wants to browse the internet (i.e. search web pages and see the contents of some of the web pages), he/she switches the device 1 on when necessary and starts the browser application, which is known as such. The browser application shows a page 100 (FIG. 1) in which there are certain fields for controlling the operation of the browser application and for downloading information. In the example of FIG. 1 the page contains menu bar 110, command bar 108 and information presentation area 109.

It may also be necessary to form a connection between the device 1 and the internet 2 either directly or via another network. In this example the device 1 is connected to the wireless communication network 4 which has one or more base stations 4.1 and a gateway 4.2 (e.g. a GGSN, Gateway GPRS Support Node) through which the connection between the wireless communication network 4 and the internet 2 can be arranged. It is also possible to use other connection mechanisms for this kind of connection as is known as such.

The documents such as web pages may comprise some structural information indicating which kind of elements are included in the document. The structural information may comprise different levels of the document. For example, the levels to be used can be titles on one or more hierarchy levels, pictures on one or more hierarchy levels (for example according to the size of the picture), different types of texts, tables, etc.

The user can use many ways to find a page to be downloaded. For example, the user can write the address of the web page into the address field 107 of the browser application or the user can use so called search pages such as www.google.com to search for the web pages. When the web page has been found the download can be started unless the user has defined that the downloading will be delayed as will be described later in this application. The user may have defined a default downloading profile for him or herself. This default downloading profile indicates to the browser application which parts of a web page or web pages are downloaded first. For example, the user may have defined that only text will be downloaded. Another alternative inter alia is that only figures are downloaded first. It may also be possible that the web pages contain different classifications for texts, figures and/or other information. Therefore, the user may define that only such parts of the text, figures and/or other information are downloaded which correspond to a certain classification. For example, a web page may contain titles and text below the titles. If the titles and the text are classified into different classes the user may then define that the titles are downloaded first, and if the user so decides, the other texts are downloaded at a later stage.

Figure 2A:
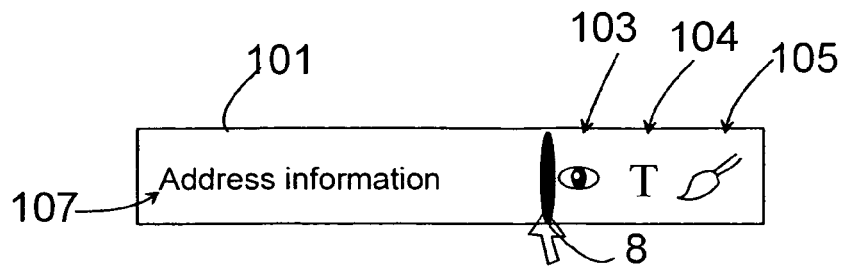
FIGS. 2a-2c depict different views according to an example embodiment of the present invention.
Figure 2B:
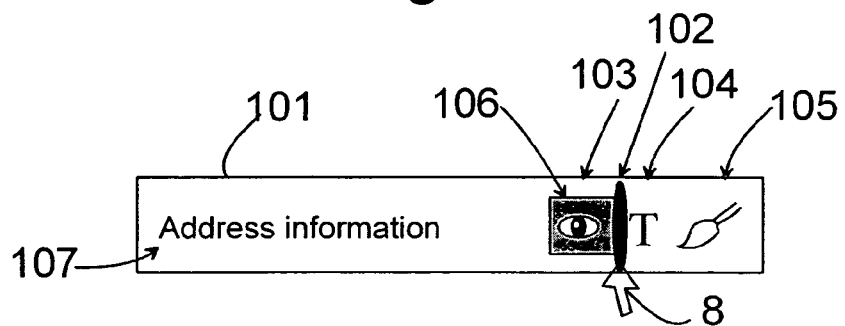
Figure 2C:
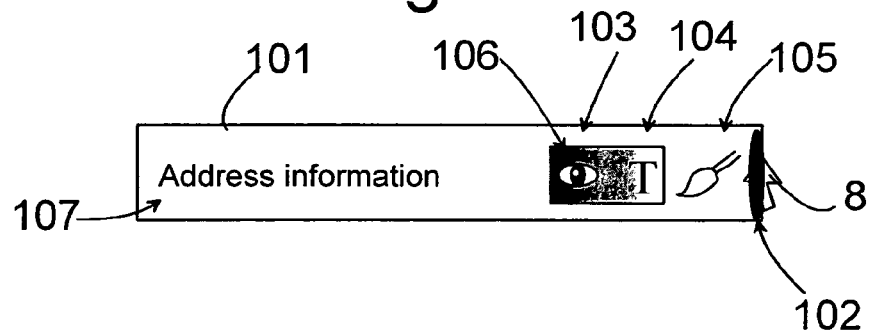

FIGS. 2a through 2c show examples of a controlling element 101 which can be used to control the downloading of a web page. The controlling element comprises a limiter 102 which indicates which parts of a web page or pages, if any, has been selected for downloading. The controlling element 101 comprises an address field 107 for indicating the address of the web page or other source of information to be selected for downloading. In some situations the address field 107 may also be used for inputting the address of the web page or other source of information to be selected for downloading. The controlling element 101 also comprises indicator fields 103, 104, 105 to indicate inter alia which kind of information the web page may contain and to define which kind of information is to be downloaded. In this example embodiment of the controlling element 101 there is a readability indicator 103, a text indicator 104 and a figure indicator 105. The purpose of the readability indicator 103 is to indicate when the web page is readable in the device 1 i.e. enough information of the web page is downloaded to enable the presentation of the web page. The text indicator 104 is used to select text for downloading and also to indicate the progress of the downloading of the text. Respectively, the figure indicator 105 is used to select figures for downloading and also to indicate the progress of the downloading of the figures. In the situation of FIG. 2a the limiter 102 is positioned so that no information is downloaded although the user has entered an address of a web page for downloading. The downloading begins, for example, when the user moves the limiter 102. It is also possible to arrange the downloading to begin on a timely basis, for example after a user defined time has elapsed.

It is assumed here that the left side of the position of the limiter 102 is selected for downloading and those types of information of the selected web page which are on the right side of the limiter 102 are not yet downloaded.

In the situation of FIG. 2b the user has moved the position of the limiter 102 so that the readability indicator 103 is on the left side of the limiter 102. At this stage the web page is not selected to be downloaded as a whole but only some structural information (basic information) of it so that the user can see some information relating to the web page and scroll the view on the display 1.1 of the device 1 (see FIG. 5) when necessary. The structural information can be shown e.g. as an icon or some other visual element, audible element etc. The icon can be represented e.g. as a figure, a text, a number, a sound, a vibration or a combination of these. Different icons may be shown for different levels of the document.

The structural information can also be used to determine which kind of information is included in the document (e.g. a web page), wherein icons are not necessarily displayed at all for such elements which are not included in the document.

Figure 3:
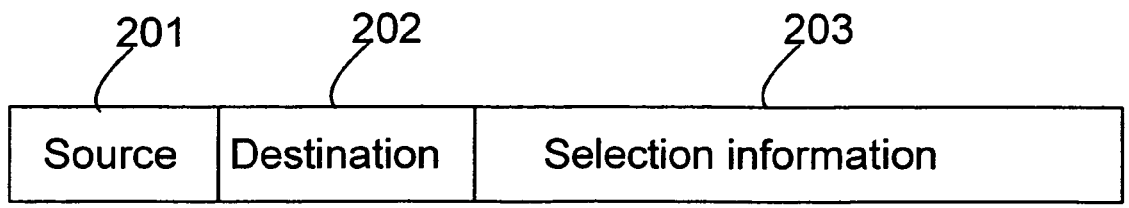
FIG. 3 depicts an example of a request message according to the present invention.

The device 1 transmits a request 200 (FIG. 3) to the mobile communication network 4 including the destination address 201, which is the address of the web page selected for downloading, the source address 202, which is the address of the device 1, so that the system can direct the request message from the source to the destination and the response (information of the selected web page) from the destination to the source, for example from the server 3 to the device 1. The request message 200 also comprises selection information 203 indicative of which part(s) of the web page is (are) requested for transfer as a response to a user action.

The wireless communication network 4 transfers the request message 200 to the internet 2 where the request message 200 is processed and directed to the network element (e.g. the server 3) indicated by the destination address. The server 3 processes the request and examines inter alia the selection information 203 and according to the contents of the selection information begins to send the information of the selected part(s) of the web page by forming response message(s) in which the response source address (the address of the server 3), the response destination address (the address of the device 1) and possible information of the web page are included. The details of the sending is known as such which is not necessary to describe in more detail here.

The response messages are directed by the system to the device 1 which processes the messages and displays the received information of the web page on the display 1.1 of the device 1. The background color of the readability indicator 103 may gradually change during the downloading to indicate the progress of the downloading. For example, when the basic information is totally downloaded the background color of substantially the whole area of the readability indicator 103 is changed from one color to another color. The levels of grey are used in FIGS. 2a through 2c as an example of these color changes. FIG. 2b indicates the situation in which the basic information is downloaded to the device 1.

In FIG. 2c the limiter 102 is not visible meaning that the limiter is at the rightmost position of the controlling element 101. This indicates that all the information of the selected web page is selected for downloading to the device 1. The background color of the text indicator 104 is partly changed indicative of that the text is partly downloaded. On the other hand, the background color of the figure indicator 105 is not changed at all yet, i.e. the background color of the figure indicator 105 is the first color. This indicates that no parts of the figure information are downloaded yet.

The above described embodiment is not the only way to indicate the progress of the download. For example, the indicators 103, 104, 105 may include a certain area (not shown) the color of which is changed during the progress of the downloading. Another alternative is that the brightness of the indicator 103, 104, 105 changes according to the progress of the downloading. Further, the controlling element 101 can also be implemented in a way that the limiter 102 is always at the right end of the controlling element 101 but the movement of the limiter 102 "covers" or "discovers" the indicator(s) 103, 104, 105. For example, in the beginning only the address field 107 is shown. If the user wants the text to be downloaded the user moves the limiter 102 to the right wherein the text indicator 104 appears on the display 1.1. If the limiter 102 is moved further to the right, the figure indicator 105 appears. Also some kind of animations e.g. an icon which illustrates an opening or closing eye or an icon which changes its form during the progress of the downloading may be used. Still another alternative to be mentioned here is that the controlling element 101 comprises check boxes by which the user can define whether to download text, figures etc.

The above described controlling element 101 can be implemented for each web page the user selects for downloading. Therefore, the user can decide by using the limiter 102 of each controlling element 101 the order in which the web pages should be downloaded and which part(s) of the web pages should be downloaded first. This possibility is useful especially when the device 1 is a mobile device in which the data transfer and data processing capabilities may be reduced compared to e.g. personal computers. In some example implementations the user defines the pages in connection with which the controlling element according to the present invention will be used. This may be due to the fact that the user wants certain pages to be downloaded as such so that the controlling element is not shown in connection with those pages. This situation may appear e.g. when the user already knows that a certain page contains only text and there is no need to display the controlling element.

Although in the above example the controlling element was related to one or more web pages which were downloaded from one device to another device the invention is also applicable to situations in which the web page(s) or some other set of information, e.g. a document containing text, pictures, comments and/or information relating to sound, is already stored into the device 1. When the information is displayed on the display 1.1 of the device 1 the controlling element 101 can be used to define what parts of the stored information will be shown and in which order. A non-restrictive example of this kind of information is a large document containing comments. This is useful for example when the user wants to view a large document but does not want the comments or pictures to be shown.

The browser application need not be a web browser application but it can also be some other application in which information can be processed, for example a so called word processing application. Further, the term "downloading" may also mean that a web page, a document or other set of information is loaded, or copied, from a non-volatile memory to a memory area which is reserved for the application which processes the information. Thus, the controlling element can be used to define which parts of the information will be copied to the memory area.

It is also possible to implement the invention so that after a page is selected for downloading, the loading will be started and at least part of the page is downloaded before the analysis will be performed. When the page or part of it is downloaded, e.g. the browser application analyses the downloaded page and displays only such parts which are defined to be displayed. The user can then change the settings of the controlling element 101 and the effects of the changes can be seen after that, without the need for downloading any further information if those parts to be shown were already downloaded. The change of the settings of the controlling element 101 may also cause the effect that some information which is displayed, is removed. For example, if pictures and text of a web page are displayed, the user can move the limiter 102 to a position which indicates that only text is intended to be shown. Then the pictures are removed from the display.

It is also possible to repeat the downloading and analyzing processes wherein part of a page is loaded first, after which an analysis of the downloaded part is performed and information is displayed, followed by a further downloading and analysis, etc.

The analysis can be performed in the device in which the information will be displayed and/or in a server of a network, for example, especially when the information is a web page. The server can be such a server in which the web page is stored, or it can be a content optimization server through which the web page is transmitted to the device.

Figure 5:
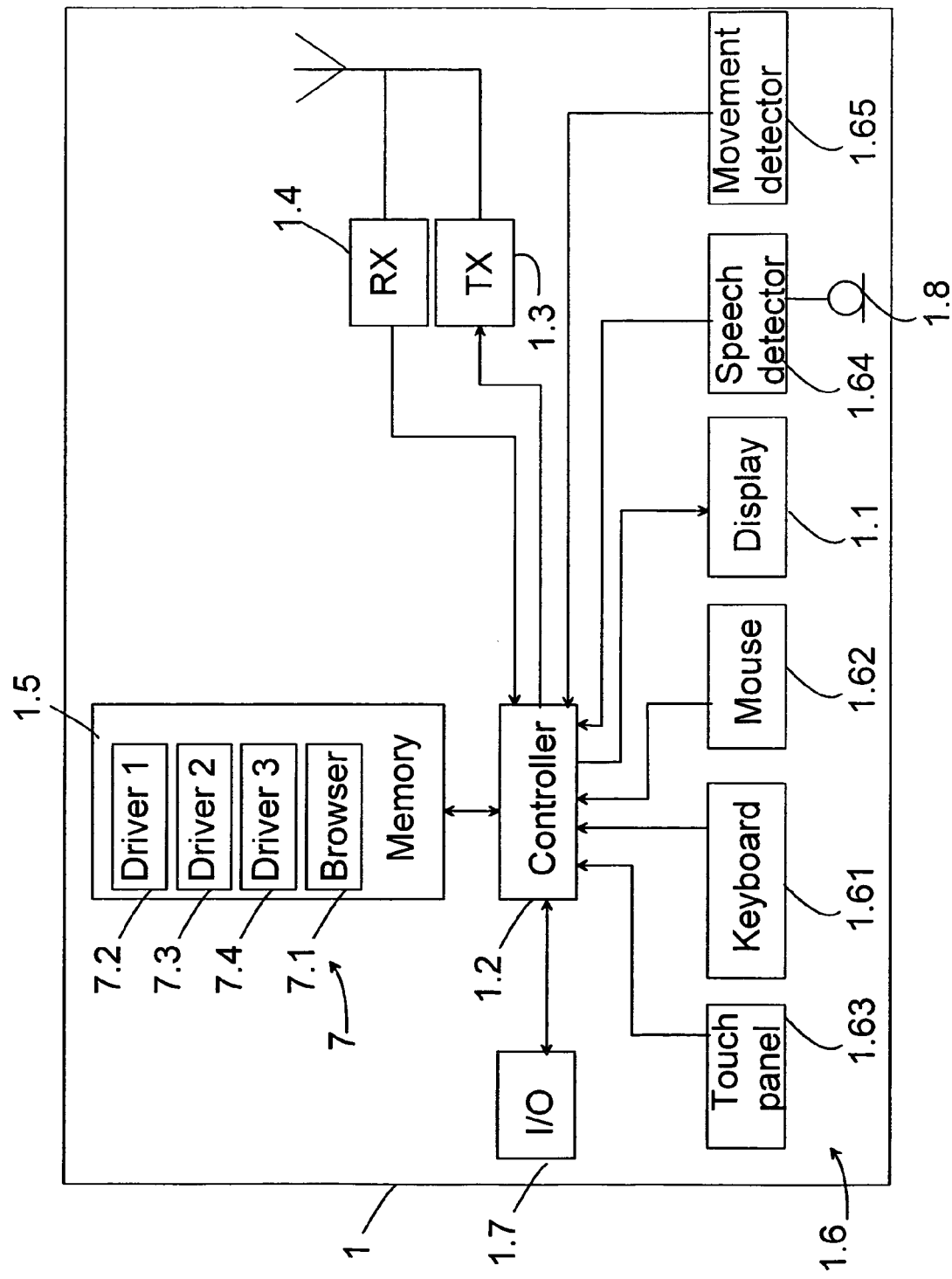
FIG. 5 depicts a device according to an example embodiment of the present invention.

Next, the device 1 according to an example embodiment of the present invention will be described in more detail with reference to FIG. 5. The device 1 in which the invention can be utilized can be, for example, a computer such as a personal computer (PC), a personal digital assistant (PDA), a wireless terminal, a device which is a combination of a wireless terminal and a PDA, etc. The device 1 comprises a display 1.1 for displaying information, one or more controllers 1.2 for controlling the operation of the device 1, a transmitter 1.3 and a receiver 1.4 for communicating with a communication network 2, 4, memory 1.5 for storing information, software etc, and one or more input devices 1.6 for inputting commands, text, etc. into the device 1. The input device 1.6 can be, for example, a keyboard 1.61, a pointing device (e.g. a mouse) 1.62, a touch pad 1.63, a speech detector 1.64, a movement detector 1.65, etc. The input device 1.6 can be part of the device 1 or it can also be externally connected to the device 1. The external connection can be a wired or a wireless connection known as such. The device 1 may also comprise input/ output means 1.7 for connecting external devices, additional memory or such to the device when necessary.

In the memory 1.5 there is provided software program(s) for providing machine executable code to be executed by the controller 1.2. The software 7 comprises the browser application 7.1 in which at least parts of the present invention can be implemented. The software 7 further comprises one or more drivers for the input device(s) 1.6. A separate driver 7 may be provided for each input device 1.6 or some input devices may use a common driver. For example, there is a keyboard driver 7.2 for detecting and/or interpreting keystrokes of the keyboard 1.61, a pointing device driver 7.3 for detecting and/or interpreting the movements of the pointing device 1.62, a touch pad driver 7.4 for the touch pad 1.63 etc.

The software program may comprise machine executable code for browsing of a document; utilizing an analysis of at least a part of a structure of said document; providing an icon for an element in said structure; and accessing at least part of said document corresponding to said icon. The software program may receive the analysis or it may comprise machine executable code for performing the analysis.

When the user of the device 1 moves the pointing device 1.62 the movements are detected and interpreted. A cursor 8 (FIGS. 2a-2c) may be shown on the display 1.1 wherein the location of the cursor 8 is changed with respect to the detected and interpreted movements. The user can input the address to the address field 107 e.g. in the following way. The user moves the pointing device 1.62 to locate the cursor 8 on the address field 107. After that the user presses a key of the pointing device 1.62 wherein the address field is activated. The user can now use the keyboard 1.61 to write the address to the address field 107. If the limiter 102 is in a correct place with respect to the user's desires, there is no need to move the limiter 102. Otherwise the user may use the pointing device 1.62 to locate the cursor on the limiter 102. The location of the cursor is informed to the browser application. The browser application examines if the cursor is on such a location in which there are some functions attached with it. In this example the browser application determines that the cursor is on the limiter 102. Now, the user can move the limiter 102 to another place e.g. by pressing a key of the pointing device 1.62 and moving the pointing device 1.62 so that the cursor 8 moves to a correct place. The new location is examined by the browser application which now determines which operations may be necessary due to the new location of the limiter. For example, if the limiter 102 is moved from the location of FIG. 2a to the location of FIG. 2b, the browser application determines that the text of the web page should be loaded. The browser application forms a request message for transmission of the text parts of the web page. The request message is included with the address defined by the contents of the address field 107 and the parameters indicating the parts of the web page which are requested to be transmitted to the device 1. The request message is transmitted to the transmitter 1.3 which forms the necessary signals (usually in packet form) and transmits them to the communication network.

The speech detector 1.64 can also be used to enter text, commands, etc. The speech detector 1.64 interprets voice signal from e.g. the microphone 1.8 and forms words according to the interpretation which is known as such.

The movement detector 1.65 detects, for example, the movements of the device 1 or some part of it and forms movement information according to the detection. The movement information can be used inter alia for moving the cursor on the display.

When the receiver 1.4 of the device 1 receives the requested information of the web page it is stored into the memory 1.5. The browser application examines the received information and calculates how much of the total amount of the requested information is received. The browser application then changes the properties of the indicator 103, 104, 105 according to the received amount as was disclosed above in the description. For example, the browser application changes the color parameters of some of the pixels forming the background of the indicator 103, 104, 105 to illustrate the progress of the downloading. The browser application may display the received information on the display 1.1 either substantially immediately after the receiving or after all the requested information is received.

The other operations with respect to the usage of the controlling element 101 are evident on the basis of the description above wherein it is not necessary to describe them in more detail here.

It should be noted that the invention is not limited to loading of web pages only but also loading of other information can be controlled by using the present invention.

The invention claimed is:

1. A method, comprising,
receiving at least a part of a structure of a document in response to a first part of a user input, wherein said structure comprises information of one or more type of elements in said document;
examining the at least a part of the structure of the document to determine one or more types of elements existing in the document;
generating a selectable icon for each type of elements existing in the document;
setting a scope of limits to a type of elements in response to a second part of the user input, said second part of the user input comprising a selection of one or more generated selectable icons;
determining, by a controller, which elements in said type of elements fall within the scope of limits;
directing requesting at least part of said document comprising said elements which fall within the scope of limits; and
receiving said at least part of said document comprising said elements which fall within the scope of limits, wherein said scope of limits comprises one or more of the following:
a lower limit, for requesting any element with size above the lower limit;
a pair of upper limit and lower limit, for requesting any element with size between the limits;
a size limit, for requesting any element with size near the limit;
a hierarchy level limit, for requesting any element above the hierarchy level in said document; or
a classification, for requesting any element that corresponds to said classification.

2. The method according to claim 1, wherein at least part of generating a selectable icon is performed while receiving the part of the structure of the document.

3. The method according to claim 1, wherein said generating a selectable icon comprises producing at least one of the following effects:
a figure;
a text;
a number;
a sound; or
a vibration.

4. The method according to claim 1, wherein the selection of one or more generated selectable icons comprises positioning a graphical limiter element to a side of the selected one or more generated selectable icons.

5. The method according to claim 1, further comprising, while receiving said at least part of said document comprising said elements which fall within the scope of limits, generating at least one graphical indication of a progress of receipt of said at least part of said document.

6. The method according to claim 5, wherein generating the at least one graphical indication comprises generating a graphical indication associated with a selectable icon, wherein the graphical indication associated with the selectable icon indicates a progress of receiving elements of the type of elements associated with the selectable icon.

7. An apparatus, comprising at least one controller and at least one memory storing computer program code, wherein the at least one memory and stored computer program code are configured to, with the at least one controller, cause the apparatus to at least:
  receive at least a part of a structure of a document in response to a first part of a user input, wherein said structure comprises information of one or more type of elements in the document;
  examine the at least a part of the structure of the document to determine one or more types of elements existing in the document;
  generate a selectable icon for each type of elements existing in the document;
  set a scope of limits to a type of elements in response to a second part of the user input, said second part of the user input comprising a selection of one or more generated selectable icons;
  determine which elements in said type of elements fall within the scope of limits;
  direct transmission of a request for requesting at least part of the document comprising said elements which fall within the scope of limits; and
  receive at least part of said document comprising said one or more elements which fall within the scope of limits,
  wherein said scope of limits comprises one or more of the following:
  a lower limit, for requesting any element with size above the lower limit;
  a pair of upper limit and lower limit, for requesting any element with size between the limits;
  a size limit, for requesting any element with size near the limit;
  a hierarchy level limit, for requesting any element above the hierarchy level in said document; or
  a classification, for requesting any element that corresponds to said classification.

8. The apparatus according to claim 7, wherein said document comprises a web page stored in another device.

9. The apparatus according to claim 7, further comprising a memory configured to store the requested part of the document.

10. The apparatus according to claim 7, wherein the apparatus comprises one of the following:
  a computer;
  a personal computer;
  a personal digital assistant;
  a wireless terminal;
  a mobile phone; or
  a combination of two or more of the above devices.

11. The apparatus according to claim 7, wherein the at least one memory and stored computer program code are configured to, with the at least one controller, cause the apparatus to generate at least part of the selectable icon while receiving the part of the structure of the document.

12. A document browser of an electronic device, comprising:
  a downloader, configured to receive at least a part of a structure of a document in response to a first part of a user input to the device, wherein said structure comprises information of one or more type of elements in the document;
  an examiner configured to examine the at least a part of the structure of the document to determine one or more types of elements existing in the document;
  a display control unit, configured to cause a display of a selectable icon for each type of elements existing in the document; and
  an analyzer, configured to set a scope of limits to a type of elements in response to a second part of the user input, to determine which elements in said type of elements fall within the scope of limits, and to generate a request for requesting at least part of the document comprising said one or more elements which fall within the scope of limits, wherein the second part of the user input comprises a selection of one or more displayed selectable icons,
  wherein the downloader is further configured to receive at least part of said document comprising said one or more elements that fall within the scope of limits, and
  wherein said scope of limits comprises one or more of the following:
  a lower limit, for requesting any element with size above the lower limit;
  a pair of upper limit and lower limit, for requesting any element with size between the limits;
  a size limit, for requesting any element with size near the limit;
  a hierarchy level limit, for requesting any element above the hierarchy level in said document; or
  a classification, for requesting any element that corresponds to said classification.

13. A computer program product comprising a computer readable storage medium storing program code thereon for use by an electronic device, wherein said computer program code comprises:
  instructions configured to direct receipt of at least a part of a structure of a document in response to a first part of a user input, wherein said structure comprises information of one or more type of elements in said document;
  instructions configured to examine the at least a part of the structure of the document to determine one or more types of elements existing in the document;
  instructions configured to generate a selectable icon for each type of elements existing in the document;
  instructions configured to set a scope of limits to a type of elements in response to a second part of the user input, said second part of the user input comprising a selection of one or more generated selectable icons;
  instructions configured to determine which elements in said type of elements fall within the scope of limits;
  instructions configured to direct a request for at least part of said document comprising said elements which fall within the scope of limits; and
  instructions configured to direct receipt of at least part of said document comprising said elements which fall within the scope of limits, wherein said scope of limits comprises one or more of the following:

a lower limit, for requesting any element with size above the lower limit;

a pair of upper limit and lower limit, for requesting any element with size between the limits;

a size limit, for requesting any element with size near the limit;

a hierarchy level limit, for requesting any element above the hierarchy level in said document; or a classification, for requesting any elements that corresponds to said classification.

* * * * *